(12) United States Patent
Kuchibhatla et al.

(10) Patent No.: US 10,416,742 B2
(45) Date of Patent: Sep. 17, 2019

(54) SMART BATTERY FOR ULTRAFAST CHARGING

(71) Applicant: Microsoft Technology Licensing, LLC, Redmond, WA (US)

(72) Inventors: Ramesh Kuchibhatla, Sammamish, WA (US); Bahram Ali, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 15/436,327

(22) Filed: Feb. 17, 2017

(65) Prior Publication Data

US 2018/0239408 A1    Aug. 23, 2018

(51) Int. Cl.
*G06F 1/26* (2006.01)
*H02J 7/02* (2016.01)
(Continued)

(52) U.S. Cl.
CPC ............ *G06F 1/266* (2013.01); *G06F 1/263* (2013.01); *G06F 13/385* (2013.01); *G06F 13/4282* (2013.01); *H01M 10/4257* (2013.01); *H01M 10/44* (2013.01); *H01M 10/46* (2013.01); *H02J 7/025* (2013.01); *H02J 7/047* (2013.01); *H02J 50/10* (2016.02); *H01M 10/443* (2013.01);
(Continued)

(58) Field of Classification Search
None
See application file for complete search history.

(56) References Cited

U.S. PATENT DOCUMENTS

| 4,549,127 A | 10/1985 | Taylor et al. |
| 5,357,187 A | 10/1994 | Park |

(Continued)

FOREIGN PATENT DOCUMENTS

| CN | 202333930 U | 7/2012 |
| CN | 103208835 A | 7/2013 |

(Continued)

OTHER PUBLICATIONS

'SM Bus Quick Start Guide' Application Note by Roger Fan, NXP, Freescale Semiconductor, Aug. 2012. (Year: 2012).*

(Continued)

*Primary Examiner* — Steven G Snyder
(74) *Attorney, Agent, or Firm* — Arent Fox LLP

(57) ABSTRACT

Methods and devices are described for charging a smart battery in a computing device. The methods and devices may include determining, by a battery management controller, a charging configuration for managing one or more battery modules of the smart battery and transmitting a charging configuration signal to one or more battery modules of the smart battery. The methods and devices may include receiving, by at least one of a plurality of charging coils, power from a wireless signal based on the wireless signal coupling energy to at least one of the plurality of charging coils at a frequency as the at least one of the plurality of charging coils and charging at least one battery module connected to a respective one of the plurality of battery control boards in response to a respective one of the plurality of charging coils receiving the power from the wireless signal.

20 Claims, 9 Drawing Sheets

(51) Int. Cl.
*H02J 7/04* (2006.01)
*G06F 13/42* (2006.01)
*G06F 13/38* (2006.01)
*H01M 10/42* (2006.01)
*H02J 50/10* (2016.01)
*H01M 10/44* (2006.01)
*H01M 10/46* (2006.01)
*H01M 10/48* (2006.01)

(52) U.S. Cl.
CPC .. *H01M 10/486* (2013.01); *H01M 2010/4271* (2013.01); *H01M 2010/4278* (2013.01); *H01M 2220/30* (2013.01); *Y02D 10/14* (2018.01); *Y02D 10/151* (2018.01)

(56) References Cited

U.S. PATENT DOCUMENTS

| | | | |
|---|---|---|---|
| 5,422,558 | A | 6/1995 | Stewart |
| 5,576,612 | A | 11/1996 | Garrett et al. |
| 5,619,116 | A | 4/1997 | Takano et al. |
| 5,659,237 | A | 8/1997 | Divan et al. |
| 5,757,163 | A | 5/1998 | Brotto et al. |
| 6,445,159 | B1 | 9/2002 | Ramsden |
| 8,018,198 | B2 | 9/2011 | Meyer et al. |
| 8,963,488 | B2 * | 2/2015 | Campanella ............ H02J 5/005 320/108 |
| 9,118,203 | B2 * | 8/2015 | Davis ..................... H02J 5/005 |
| 9,391,671 | B2 * | 7/2016 | Kim ...................... H04B 5/0031 |
| 9,899,878 | B2 * | 2/2018 | Davis ..................... H02J 5/005 |
| 2002/0089305 | A1 | 7/2002 | Park et al. |
| 2005/0040795 | A1 | 2/2005 | Riley et al. |
| 2008/0079392 | A1 * | 4/2008 | Baarman ................ H02J 7/025 320/108 |
| 2010/0244579 | A1 | 3/2010 | Sogabe et al. |
| 2011/0127952 | A1 * | 6/2011 | Walley ................ G06K 7/10207 320/108 |
| 2011/0156637 | A1 | 6/2011 | Thorsell et al. |
| 2012/0235636 | A1 * | 9/2012 | Partovi .................. H02J 7/025 320/108 |
| 2013/0020988 | A1 * | 1/2013 | Kim ...................... H02J 7/0013 320/108 |
| 2013/0119773 | A1 * | 5/2013 | Davis ..................... H02J 5/005 307/104 |
| 2013/0119929 | A1 | 5/2013 | Partovi |
| 2014/0021911 | A1 * | 1/2014 | Baarman ................ H02J 7/025 320/108 |
| 2015/0042267 | A1 * | 2/2015 | Wang .................... H02J 7/0052 320/108 |
| 2015/0364929 | A1 * | 12/2015 | Davis ..................... H02J 5/005 307/104 |
| 2016/0056664 | A1 * | 2/2016 | Partovi .................. H02J 7/025 307/104 |
| 2016/0118834 | A1 * | 4/2016 | Swope ................... H02J 50/12 320/108 |
| 2016/0181857 | A1 * | 6/2016 | Konanur ................ H01Q 7/00 320/108 |
| 2016/0380467 | A1 * | 12/2016 | Shao ..................... H02J 7/025 320/108 |
| 2017/0047786 | A1 * | 2/2017 | Park ....................... H02J 7/02 |
| 2017/0063131 | A1 * | 3/2017 | Sultenfuss ............. H02J 7/025 |
| 2017/0085114 | A1 * | 3/2017 | Gao ....................... H02J 7/025 |
| 2018/0013309 | A1 * | 1/2018 | Winkler ................. H02J 7/025 |
| 2018/0034302 | A1 * | 2/2018 | Van Den Berg ........ H02J 7/025 |
| 2018/0375349 | A1 * | 12/2018 | Bonilla ................ H02J 7/0027 |

FOREIGN PATENT DOCUMENTS

| | | | |
|---|---|---|---|
| CN | 104967222 | A * | 10/2015 |
| CN | 206163493 | U * | 5/2017 |
| CN | 206250195 | U * | 6/2017 |
| EP | 2565959 | A2 | 3/2013 |
| KR | 2014082208 | A * | 7/2014 |
| WO | 2009128080 | A1 | 10/2009 |
| WO | 2015166290 | A1 | 11/2015 |

OTHER PUBLICATIONS

'The Scientist and Engineer's Guide to Digital Signal Processing' by Steven W. Smith—Chapter 11, copyright 1997-1998. (Year: 1998).*

'Making a wire-free future' by Rob Matheson, MIT News Office, Jul. 10, 2014. (Year: 2014).*

Machine Translation of CN103208835A, Liang et al., published Jul. 17, 2013. (Year: 2013).*

"International Search Report Issued in PCT Application No. PCT/US18/017516", dated May 17, 2018, 13 Pages.

"Cell Balancing", http://www.mpoweruk.com/balancing.htm, Retrieved on: Nov. 22, 2016, 4 pages.

* cited by examiner

SMART BATTERY FOR ULTRAFAST CHARGING

BACKGROUND

The present disclosure relates to a computer device, and more particularly, to ultrafast charging of a smart battery on a computing device.

Users have access to an ever-increasing variety of portable computing devices with which the users interact on any given day. For example, users may carry a mobile phone and tablet, a portable music player, wearable devices (e.g., a watch, band, or other wearable), and so on. Further, these computing devices may include additional peripheral devices used to expand the functionality of the computing devices, such as powered headphones, an active stylus, cursor control devices (e.g., a mouse or trackpad), dedicated game controllers, and so forth.

This multitude of devices and the requirement of charging the batteries of each of the computing devices may quickly become frustrating to a user. A vastly increasing number of electronic devices are being manufactured that are powered by rechargeable batteries. For example, a wide variety of smart phones, tablet computers, personal media players, cameras, handheld game consoles, video game controllers, wearable devices (e.g., wearable fitness devices), and Internet of Things devices are being manufactured that include embedded rechargeable batteries. As stated above, modern smartphones can perform just like a mini computer; however, unlike computers that may be used with power cords for most of the time, the battery inside the smartphone may be a sole power source when the user carries the smartphone. Therefore, it may be inconvenient for the users if the battery does not last long enough and, consequently, the smartphone may lose its desired portability if the user is then forced to charge it often.

In order to solve the above-mentioned problem, wireless charging or non-contact charging technology has been developed and is currently used for many computing devices. The wireless charging allows for the transmission/reception of power through a wireless signal, and may be used, for example, in a system capable of automatically charging a battery by putting a computing device on, or near, a charging pad without any connection through a separate charging connector.

A common goal for many of these computing devices is to wirelessly charge the battery faster rate. Accordingly, if the maximum charging power per receiver is fixed (e.g. 15 W), the battery cannot be charged faster without increasing the number of wireless receivers. Further, problems may occur when the number of wireless power receivers increases.

There are continuing increases in the efficiency and storage capabilities of batteries, and a continuing desire for improving the rate of charge of smart batteries. Therefore, there is a need in the art for more efficient charging of smart batteries in computing devices.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its purpose is to present some concepts of one or more implementations in a simplified form as a prelude to the more detailed description that is presented later.

In one example, a method of charging a smart battery of a computing device. The described example includes determining, by a battery management controller, a charging configuration for managing one or more battery modules of the smart battery. The described example includes transmitting, by a battery management controller, a charging configuration signal to one or more battery modules of the smart battery in response to determining the charging configuration, wherein each battery module includes one of a plurality of battery control boards connected to the battery management controller via an internal bus. The described example includes receiving, by at least one of a plurality of charging coils, power from a wireless signal based on the wireless signal coupling energy to at least one of the plurality of charging coils at a frequency as the at least one of the plurality of charging coils and based on the charging configuration, wherein each of the plurality of charging coils connect to a respective one of the plurality of battery control boards. The described example includes charging at least one battery module connected to a respective one of the plurality of battery control boards in response to a respective one of the plurality of charging coils receiving the power from the wireless signal and based on a charging configuration signal transmitted by the battery management controller.

In another example, a smart battery of a computing device is provided. The described example includes a battery management controller configured to manage one or more battery modules of the smart battery. The described example further includes a plurality of battery control boards connected to the battery management controller via an internal bus, wherein each of the plurality of battery control boards communicates with the other battery control boards and the battery management controller via the internal bus. The described example further includes a plurality of charging coils configured to receive power from a wireless signal based on the wireless signal coupling energy to at least one of the plurality of charging coils at a frequency as the at least one of the plurality of charging coils, wherein each of the plurality of charging coils connects to a respective one of the plurality of battery control boards. The described example further includes at least one battery module, wherein each battery module is connected to respective ones of the plurality of battery control boards, and wherein each battery module is charged based on the power received by the plurality of charging coils connected to the respective ones of the plurality of battery control boards and a charging configuration signal transmitted by the battery management controller via the internal bus.

In a further example, computer-readable medium storing computer-executable instructions executable by a processor for charging a smart battery of a computing device. The described example includes instructions for determining, by a battery management controller, a charging configuration for managing one or more battery modules of the smart battery. The described example includes instructions for transmitting, by a battery management controller, a charging configuration signal to one or more battery modules of the smart battery in response to determining the charging configuration, wherein each battery module includes one of a plurality of battery control boards connected to the battery management controller via an internal bus. The described example includes instructions for receiving, by at least one of a plurality of charging coils, power from a wireless signal based on the wireless signal coupling energy to at least one of the plurality of charging coils at a frequency as the at least one of the plurality of charging coils and based on the charging configuration, wherein each of the plurality of charging coils connect to a respective one of the plurality of battery control boards. The described example includes instructions for charging at least one battery module connected to a respective one of the plurality of battery control boards in response to a respective one of the plurality of charging coils receiving the power from the wireless signal and based on a charging configuration signal transmitted by the battery management controller.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The specific features, implementations, and advantages of the disclosure will become better understood with regard to the following description, appended claims, and accompanying drawings where:

DETAILED DESCRIPTION

Figure 1:
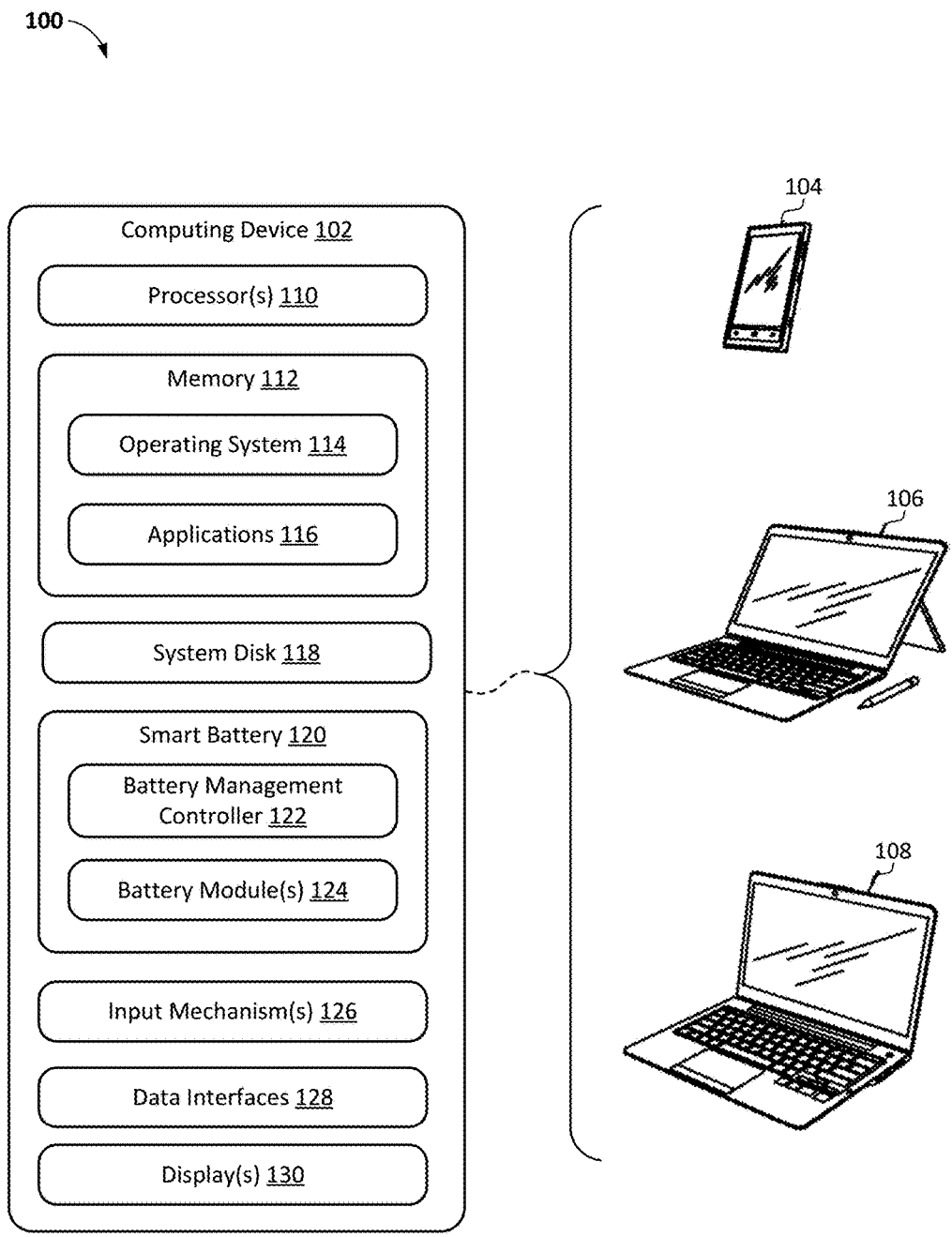
FIG. 1 is a schematic block diagram of an example architecture of a computing device including a smart battery configured according to the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure relates to the charging of smart batteries. As such, improvements are needed corresponding to the rate of charging of batteries, and in particular, smart batteries. Conventional solutions for wireless charging smart batteries do not utilize more than one charging coil per battery and did not take into consideration the physical configuration of the charging coils of the smart battery. Moreover, conventional solutions did not manage each battery module differently and independently from other battery modules of the smart battery system, thereby decreasing the functionality and flexibility of the smart battery.

Accordingly, the present methods and apparatuses may provide an efficient solution, as compared to conventional solutions, by providing ultrafast charging of a smart battery. The present disclosure provides one or more mechanisms, including a battery management controller configured to manage one or more battery modules of the smart battery. The one or more mechanisms also include a plurality of battery control boards connected to the battery management controller via an internal bus, wherein each of the plurality of battery control boards communicates with the other battery control boards and the battery management controller via the internal bus and a plurality of charging coils configured to receive power, transmitted by a transmitter, from a wireless signal based on the wireless signal coupling energy to at least one of the plurality of charging coils at a frequency as the at least one of the plurality of charging coils, wherein each of the plurality of charging coils connects to a respective one of the plurality of battery control boards. Additionally, the one or more mechanisms also include at least one battery module, wherein each battery module contains a respective one of the plurality of battery control boards, and wherein each battery module is charged based on the power received by the plurality of charging coils connected to the respective ones of the plurality of battery control boards and a charging configuration signal transmitted by the battery management controller via the internal bus. Further, the battery management controller configured to communicate to the transmitter via a short-range communication technology (e.g. NFC, Bluetooth, infrared, etc.), to transfer control information such as identification and configuration data, or alternatively communicate through load modulation of one or more of the plurality of charging coils.

FIG. 1 illustrates an example operating environment 100 in which techniques for ultrafast charging a smart battery may be implemented. Operating environment 100 includes a computing device 102, which is illustrated with three examples: a smart phone 104, a tablet computing device 106 (with optional keyboard), and a laptop computer 108, though other computing devices and systems, such as netbooks, health-monitoring devices, sensor nodes, smart watches, fitness accessories, Internet-of-Things (IoT) devices, wearable computing devices, media players, and personal navigation devices may also be used.

Computing device 102 includes computer processor(s) 110 and memory 112. Memory 112 may store program modules and/or instructions that are accessible for execution by processor 110 and/or data for use by the programs executing on processor 110. For example, memory 112 includes an operating system 114 and applications 116, which enable various operations of computing device 102. Operating system 114 manages resources of computing device 102, such as processor 110, memory 112, and the like (e.g., hardware subsystems). Applications 116 comprise tasks or threads that access the resources managed by operating system 114 to implement various operations of computing device 102. Further, for example, memory 112 may store a window manager application that is used by processor 110 to present a graphical user interface (GUI) on display 130. In addition, memory 112 may store applications 116 and other information for use by and/or generated by other components of computing device 102. Memory 112 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computing device 102 may include or may be communicatively connected with a system disk 118, such as a CD-ROM or other removable memory device. System disk 118 may include programs and/or instructions that computing device 102 can use, for example, to boot operating system in the event that booting operating system 114 from memory 112 fails. System disk 118 may be communicatively coupled to the other components of computing device 102.

Computing device 102 also includes smart battery 120, from which computing device 102 can draw power to operate. Smart battery 120 includes a battery management controller 122 and battery module(s) 124. In an example, each battery module 124 may include at least a battery control board, and a charging coil, as described in further detail below. Generally, smart battery 120 may include firmware or hardware (e.g., battery management controller 122) configured to enable computing device 102 to draw operating power from battery module(s) 124 or to apply charging power to battery module(s) 124. battery module(s) 124 may include any suitable number or type of rechargeable battery cells, such as lithium-ion (Lion), lithium-polymer (Li-Poly), lithium ceramic (Li-C), flexible printed circuit (FPC) Li-C, and the like implementations and uses of smart battery 120 vary and are described in greater detail below.

Smart battery 120 may be configured to determine by battery management controller 122, a charging configuration for managing one or more battery modules 124 of the smart battery 120. Smart battery 120 may transmit, by battery management controller 122, a charging configuration signal to one or more battery modules 124 of the smart battery in response to determining the charging configuration, wherein each battery module includes one of a plurality of battery control boards connected to the battery management controller via an internal bus. Further, smart battery 120 may receive, by at least one of a plurality of charging coils, power from a wireless signal based on the wireless signal coupling energy to at least one of the plurality of charging coils at a frequency as the at least one of the plurality of charging coils and based on the charging configuration, wherein each of the plurality of charging coils connect to a respective one of the plurality of battery control boards. Additionally, smart battery 120 may charge at least one battery module connected to a respective one of the plurality of battery control boards in response to a respective one of the plurality of charging coils receiving the power from the wireless power signal and based on a charging configuration signal transmitted by the battery management controller 122.

Computing device 102 may also include display 130, input mechanisms 126, and data interfaces 128. Display device 130 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 130 may be integrated within computing device 102. For instance, display 130 may be a screen of a mobile telephone. Alternatively, display 130 may be a stand-alone device coupled to computing device 102 via a wired or wireless communications link. For instance, display 130 may be a computer monitor or flat panel display connected to a personal computer via a cable or wireless link.

Input mechanisms 126 may include gesture-sensitive sensors and devices, such as touch-based sensors and movement-tracking sensors (e.g., camera-based), buttons, touch pads, accelerometers, and microphones with accompanying voice recognition software, to name a few. In some cases, input mechanisms 126 are integrated with display 130, such an in a touch-sensitive display with integrated touch-sensitive or motion-sensitive sensors.

Data interfaces 128 include any suitable wired or wireless data interfaces that enable computing device 102 to communicate data with other devices or networks. Wired data interfaces may include serial or parallel communication interfaces, such as a universal serial bus (USB) and local-area-network (LAN). Wireless data interfaces may include transceivers or modules configured to communicate via infrastructure or peer-to-peer networks. One or more of these wireless data interfaces may be configured to communicate via near-field communication (NFC), a personal-area-network (PAN), a wireless local-area-network (WLAN), or wireless wide-area-network (WWAN). In some cases, operating system 114 or a communication manager (not shown) of computing device 102 selects a data interface for communications based on characteristics of an environment in which computing device 102 operates.

Figure 2:
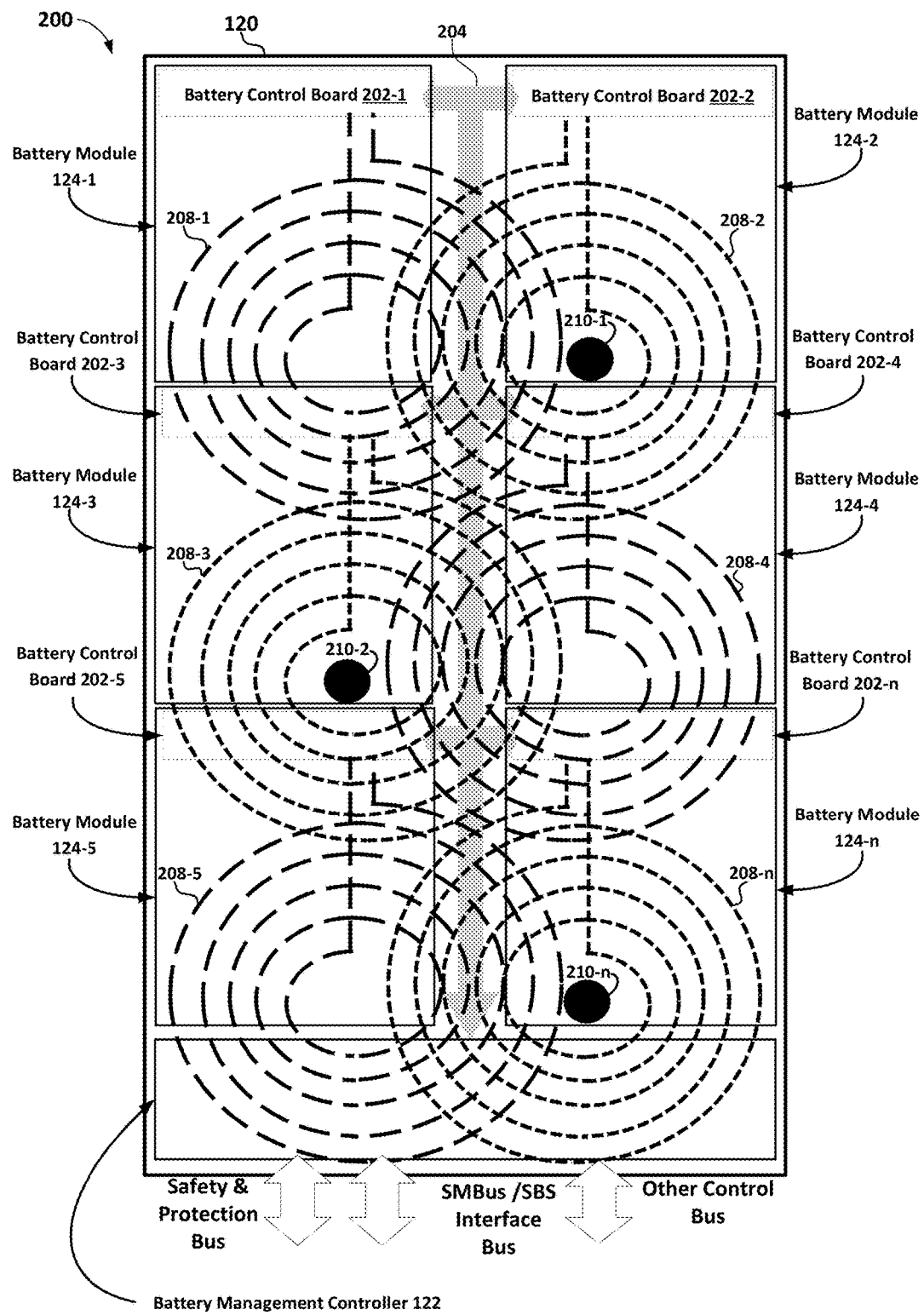
FIG. 2 is a schematic diagram of an example smart battery of the computer device of FIG. 1.

Referring now to FIG. 2, conceptual diagram 200 is shown of an example of a structure of a smart battery and its components. For example, the conceptual diagram 200 includes an example of smart battery 120 (FIG. 1) having battery management controller 122 that manages the charging of battery modules 124 based on a charging configuration.

In an example, FIG. 2 shows six battery modules. However, FIG. 2 is provided by way of illustration and not of limitation. In particular, smart battery 120 may include battery modules 124-1, 124-2, 124-3, 124-4, 124-5, and 124-n. Each battery module may include a battery control board, such as one of battery control boards 202-1, 202-2, 202-3, 202-4, 202-5, and 202-n, each of which manages the charging of its respective battery module. Battery control boards 202-1, 202-2, 202-3, 202-4, 202-5, and 202-n are connected to battery management controller 122 via an internal bus 204, and may communicate with one another and with the battery management controller 122 via the internal bus 204. Each battery module may further include a charging coil, such as charging coils 208-1, 208-2, 208-3, 208-4, 208-5, and 208-n, where each of these coils is configured to receive a wireless power signal resonating at a same frequency as the respective charging coil. Each charging coil 208-1, 208-2, 208-3, 208-4, 208-5, and 208-n is connected to the respective battery control board. Each battery module may also include at least one or more battery cells, connected to the respective battery control board.

Each battery control board 202-1, 202-2, 202-3, 202-4, 202-5, and 202-n charges battery module 124-1, 124-2, 124-3, 124-4, 124-5, and 124-n, respectively, in response to the respective charging coil power from a wireless signal based on the wireless signal coupling energy to the respective charging coil at a frequency as the respective charging coil, and based on a charging configuration transmitted by the battery management controller 122 via the internal bus 204. Battery modules 124-1, 124-2, 124-3, 124-4, 124-5, and 124-n are configured to store charge or energy and to release the charge or energy to the computing device 102. In particular, charging coils 208-1, 208-2, 208-3, 208-4, 208-5, and 208-n may be configured as antennas in order to harvest the wireless energy in the signals incident on the coils. After charging coils 208-1, 208-2, 208-3, 208-4, 208-5, and 208-n collect the wireless energy, it is passed on to battery control boards 202-1, 202-2, 202-3, 202-4, 202-5, and 202-n, respectively, where the power from the wireless signal is converted into DC power. In some instances, battery control boards 202-1, 202-2, 202-3, 202-4, 202-5, and 202-n may include a low-pass filter (not shown) that may match the load with a rectifier (not shown) and lock the high order harmonics generated in order to achieve high energy conversion efficiency.

While charging coils 208-1, 208-2, 208-3, 208-4, 208-5, and 208-n are shown as spiral antennas, it is noted that they can be any type of antenna, such as, a dipole, Yagi-Uda antenna, microstrip antenna, monopole, coplanar patch, or parabolic antenna. Moreover, each charging coil 208-1, 208-2, 208-3, 208-4, 208-5, and 208-n may partially overlap with at least one other charging coil in order to eliminate any power loss and improve power harvesting efficiency. For example, charging coil 208-1 may partially overlap with charging coils 208-2 and 208-3. In another example, charging coil 208-3 may overlap with charging coils 208-1, 208-4, and 208-5.

Battery management controller 122 may configure the battery control boards 202-1, 202-2, 202-3, 202-4, 202-5, and 202-n to receive the power from the wireless signal simultaneously. Moreover, battery management controller 122 may configure at least one of the battery control boards 202-1, 202-2, 202-3, 202-4, 202-5, and 202-n to modify their respective charging coil 208-1, 208-2, 208-3, 208-4, 208-5, and 208-n to receive the wireless power signal in at least one of a time division multiplex configuration or a frequency division multiplex configuration.

In an example, for the time division multiplex configuration, battery management controller 122 may transmit the charging configuration to battery control boards 202-1, 202-2, 202-3, 202-4, 202-5, and 202-n indicating a charging scheme in which certain battery modules are charging at alternating time periods. In one example, battery management controller 122 may transmit the charging configuration to indicate that charging coils 208-1, 208-4, and 208-5 receive the wireless power signal for a specific time period while charging coils 208-2, 208-3, and 208-n are disabled. Then for another time period, charging coils 208-1, 208-4, and 208-5 are disabled while charging coils 208-2, 208-3, and 208-n receive the wireless power signal.

In another example, for the frequency division multiplex configuration, battery management controller 122 may transmit the charging configuration to battery control boards 202-1, 202-2, 202-3, 202-4, 202-5, and 202-n indicating a charging scheme in which one or more battery modules receive the wireless power signal at different frequencies. Charging coils 208-1, 208-2, 208-3, 208-4, 208-5, and 208-n may each collect energy from systems operating at different frequencies to maximize output power. In one example, battery management controller 122 may transmit the charging configuration to indicate that charging coils 208-1, 208-4, and 208-5 receive the wireless power signal at a first frequency, and charging coils 208-2, 208-3, and 208-n receive the wireless power signal at a second frequency. In a further example, battery management controller 122 may utilize a combination of the time division multiplex and frequency division multiplex configurations.

As described above, battery management controller 122 may be configured to monitor and track the individual performance of each battery module 124-1, 124-2, 124-3, 124-4, 124-5, and 124-n based on parameters received from one or more of the battery control boards 202-1, 202-2, 202-3, 202-4, 202-5, and 202-n, such as, but not limited to, temperature, number of cycles, battery age, total charge, charging rate, storage capacity, etc. Battery management controller 122 and/or each of battery control boards 202-1, 202-2, 202-3, 202-4, 202-5, and 202-n, may determine whether one or more of the parameters of a respective one of the at least one battery module 124-1, 124-2, 124-3, 124-4, 124-5, and 124-n meets a set threshold, and adjust the charging configuration of the one or more battery modules of the smart battery 120 based on that determination. Further, battery management controller 122 transmits, via the internal bus 204, the charging configuration signal to one or more of the plurality of battery control boards 202-1, 202-2, 202-3, 202-4, 202-5, and 202-n to disable the respective one of the plurality of charging coils 208-1, 208-2, 208-3, 208-4, 208-5, and 208-n based on the determination that one of the parameters of the respective one of the at least one battery module 124-1, 124-2, 124-3, 124-4, 124-5, and 124-n meets a set threshold.

For example, while monitoring battery module 124-1, battery management controller 122 may communicate with battery control board 202-1 to determine that the parameter of battery module 124-1 meets a maximum set threshold based on calculating the existing energy (e.g. Watt-hour) of the battery module 124-1. Then, battery management controller 122 and/or battery control board 202-1 adjusts the charging configuration of battery module 124-1 based on a determination that the parameter of battery module 124-1 meets the maximum set threshold. In some instances, battery management controller 122 transmits, via the internal bus 204, the charging configuration signal to battery control board 202-1 to disable the respective charging coil 208-1 based on the determination that the parameter of the respective battery module 124-1 meets the maximum set threshold.

Each battery module 124-1, 124-2, 124-3, 124-4, 124-5, and 124-n may optionally include a position alignment magnet that is used to align the charging coil with respect to a transmitter's respective charging coil. For example, as shown in FIG. 2, position alignment magnets 210-1, 210-2, and 210-n may be positioned at the center of charging coils 208-2, 208-3, and 208-n, respectively. The position alignment magnets may align computing device 102 (FIG. 1) with a charging station in order to optimize the power transfer between computing device 102 and the charging station. Although 3 position alignment magnets are described in this example, more or fewer position alignment magnets may be used.

The battery management controller 122 includes a System Management Bus (SMBus) and a Smart Battery System (SBS) interface for communicating information between the smart battery and one or more components of the computing device.

Figure 3:
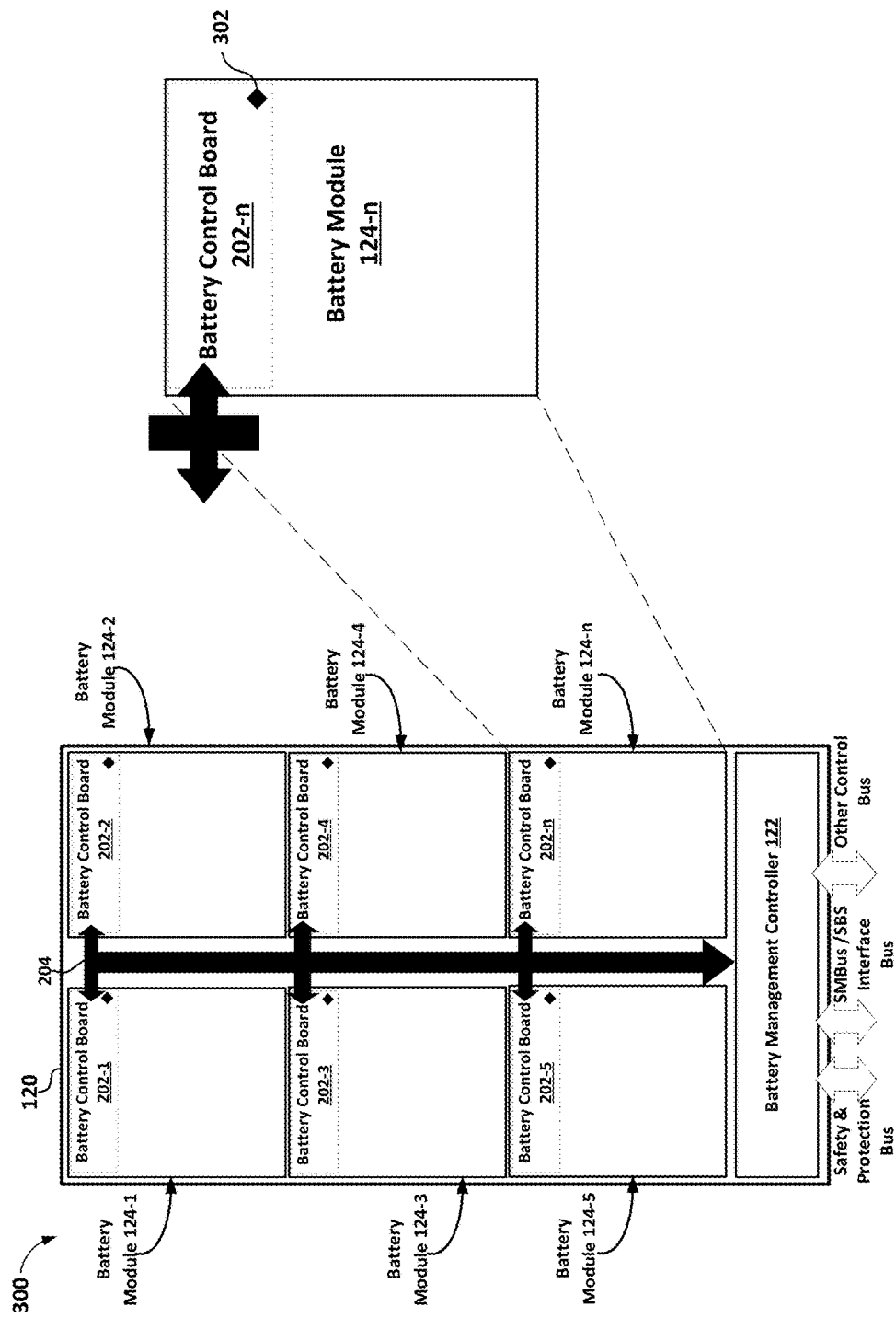
FIG. 3 is a schematic diagram of an example smart battery configured with temperature sensors of the computer device of FIG. 1.

Referring to FIG. 3, conceptual diagram 300 is shown of another example of a structure of a smart battery and its components. For example, the conceptual diagram 300 includes an example of smart battery 120 (FIG. 1) including battery management controller 122 that manages the battery modules based on a charging configuration, and an optional temperature control sensor 302 included in each battery module 124-1, 124-2, 124-3, 124-4, 124-5, and 124-n. Although not shown, each battery module 124-1, 124-2, 124-3, 124-4, 124-5, and 124-n of smart battery 120 may include at least one charging coil, such as charging coils 208-1, 208-2, 208-3, 208-4, 208-5, and 208-n.

Battery control boards 202-1, 202-2, 202-3, 202-4, 202-5, and 202-n may each include at-least one power line, at-least one sensor line, and at-least one control line configured to monitor the at least one battery module 124-1, 124-2, 124-3, 124-4, 124-5, and 124-n, respectively, and communicate, via the internal bus 204, with the battery management controller 122. Battery control boards 202-1, 202-2, 202-3, 202-4, 202-5, and 202-n may each optionally include at least one temperature control sensor, such as temperature control sensor 302 included in battery control board 202-n. Further, each temperature control sensor may be configured to monitor a temperature of the at least one battery module 124-1, 124-2, 124-3, 124-4, 124-5, and 124-n. For example, temperature control sensor 302 may monitor the temperature of battery module 124-n.

Battery control boards 202-1, 202-2, 202-3, 202-4, 202-5, and 202-n may utilize a respective temperature control sensor, such as temperature control sensor 302, to determine whether the temperature of the respective battery module 124-1, 124-2, 124-3, 124-4, 124-5, and 124-n exceeds a maximum temperature threshold. Based on the determination that the temperature of the respective battery module 124-1, 124-2, 124-3, 124-4, 124-5, and 124-n exceeds a maximum temperature threshold, battery control boards 202-1, 202-2, 202-3, 202-4, 202-5, and 202-n may disable the respective charging coil 208-1, 208-2, 208-3, 208-4, 208-5, and 208-n, so as to prevent damage and/or malfunction to the respective battery module 124-1, 124-2, 124-3, 124-4, 124-5, and 124-n.

Figure 4:
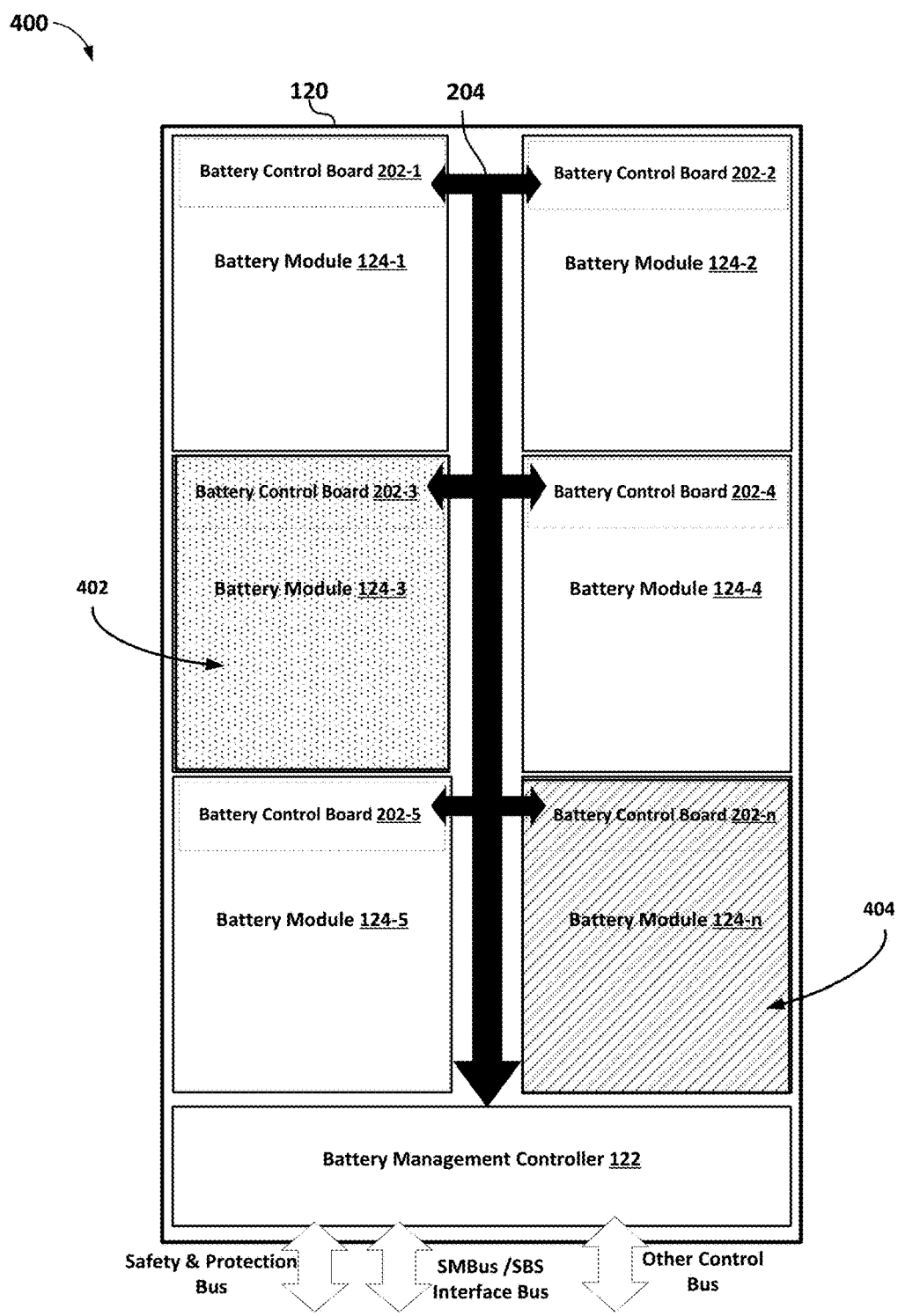
FIG. 4 is a schematic diagram of an example smart battery configured with a redundant battery module of the computer device of FIG. 1.

Referring to FIG. 4, conceptual diagram 400 is shown of another example of a structure of a smart battery and its components. For example, the conceptual diagram 400 includes an example of smart battery 120 (FIG. 1) including replaceable battery modules to accommodate for redundancy. Although not shown, each battery module of smart battery 120 may include at least one charging coil, such as charging coils 208-1, 208-2, 208-3, 208-4, 208-5, and 208-n.

As described above, battery control boards 202-1, 202-2, 202-3, 202-4, 202-5, and 202-n may each include at-least one power line, at-least one sensor line, and at-least one control line configured to monitor the at least one battery module 124-1, 124-2, 124-3, 124-4, 124-5, and 124-n, respectively, and communicate, via the internal bus 204, with the battery management controller 122. In addition to the power lines, sensor lines, and control lines, each battery control board 202-1, 202-2, 202-3, 202-4, 202-5, and 202-n includes a shared internal bus channel (not shown) to the battery management controller 122. As such, each of the respective battery module 124-1, 124-2, 124-3, 124-4, 124-5, and 124-n connect through a dedicated internal bus channel to the battery management controller 122 through the respective battery control board 202-1, 202-2, 202-3, 202-4, 202-5, and 202-n. Alternatively, each battery control board 202-1, 202-2, 202-3, 202-4, 202-5, and 202-n connect through a shared bus channel to the battery management controller 122.

In an example, due to any one of a number of factors, including a change in the charging configuration, battery management controller 122 may determine to receive power from battery module 404 instead of battery module 402. In some instances, battery management controller 122 may detect an issue with battery control board 202-3 and/or battery module 124-3 of battery module 402, such as, battery module 124-3 is not charging properly, battery control board 202-3 is not responding to one or more signals transmitted by battery management controller 122, or the respective charging coil will not turn on. In order to accommodate for redundancy, battery management controller 122 may switch from battery module 402 to battery module 404, and power at least a component or application 116 of computing device 102 with at least battery module 404 instead of battery module 402.

Figure 5:
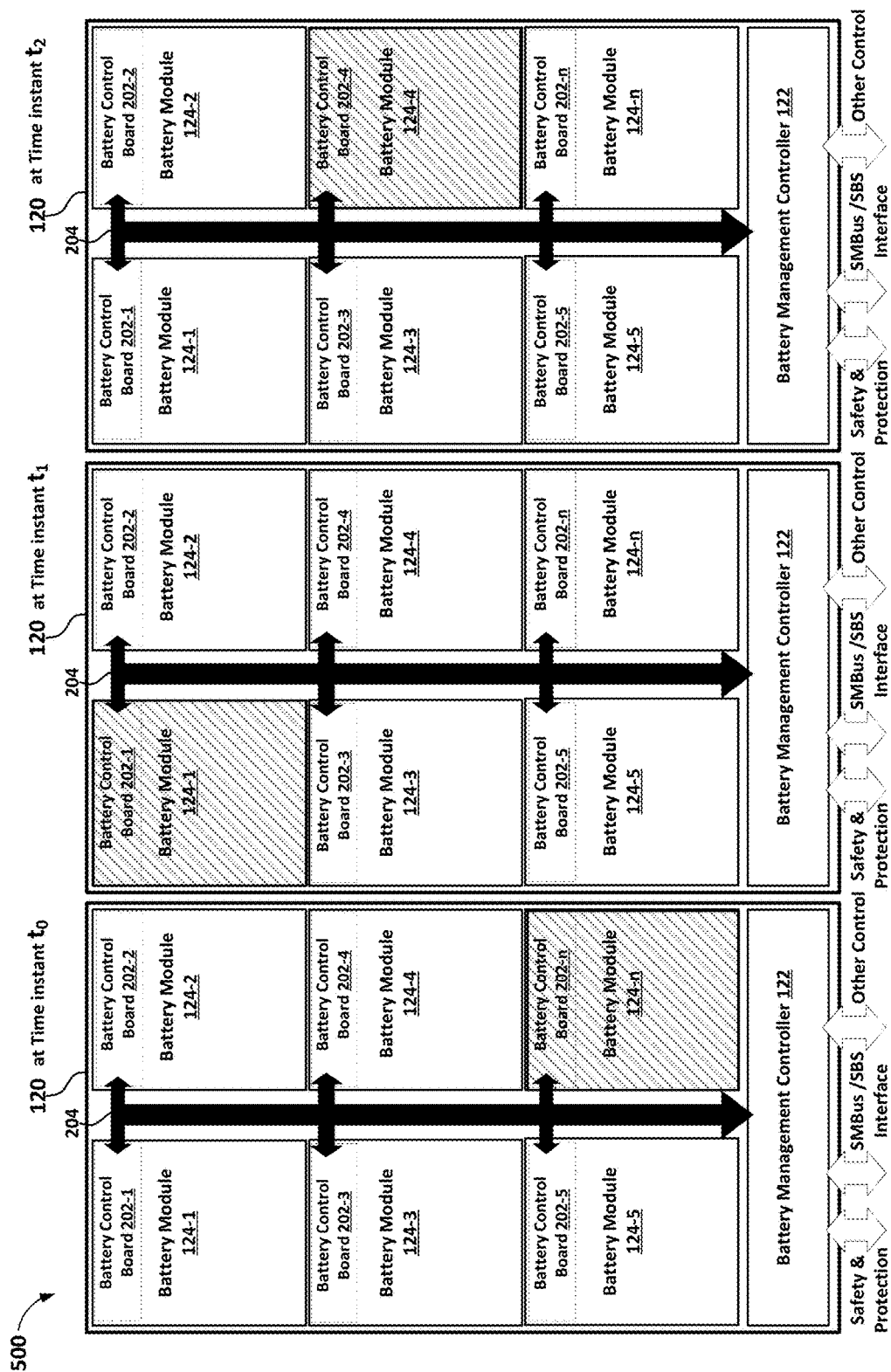
FIG. 5 is a schematic diagram of an example of a smart battery implementing wear-leveling techniques of the computer device of FIG. 1.

Referring to FIG. 5, conceptual diagram 500 is shown of another example of a smart battery in three different instants of time, illustrating how the wear-leveling technique works in prolonging the life expectancy of the smart battery by dynamically mapping the active and inactive battery modules within a computing device. For example, the conceptual diagram 500 includes an example of smart battery 120 (FIG. 1) at time instant $t_0$ with battery module 124-n mapped to be inactive, while at time instant $t_1$ the smart battery 120 has battery module 124-1 mapped to be inactive, and at time instant t2 the smart battery 120 has battery module 124-4 mapped to be inactive, to accommodate for wear leveling by distributing the number of discharge cycles evenly across all the battery modules, hence increasing battery longevity. Although not shown, each battery module of smart battery 120 may include at least one charging coil, such as charging coils 208-1, 208-2, 208-3, 208-4, 208-5, and 208-n. Similarly, each battery module of smart battery 120 may also include at least one charging coil, similar to, charging coils 208-1, 208-2, 208-3, 208-4, 208-5, and 208-n.

Battery management controller 122 may accommodate for wear leveling of individual battery modules 124-1, 124-2, 124-3, 124-4, 124-5, and 124-n by determining whether a wear level (i.e. number of cycles) corresponding to one of the battery modules 124-1, 124-2, 124-3, 124-4, 124-5, and 124-n meets a set wear level threshold. Battery management controller 122 may then transmit a wear leveling signal to at least one of battery control boards 202-1, 202-2, 202-3, 202-4, 202-5, and 202-n, based on a determination that the wear level corresponding to one of the battery modules 124-1, 124-2, 124-3, 124-4, 124-5, and 124-n meets the set wear level threshold. The wear level signal can be one of activating or deactivating the addressed battery module.

The number of inactive battery modules, is set to be below the computing device's minimum power capacity requirements. Alternatively, the use of additional battery modules in a smart battery can accommodate for wear leveling since battery modules may be cycled through for relief from charging cycles thereby increasing their lifetimes.

Figure 6:
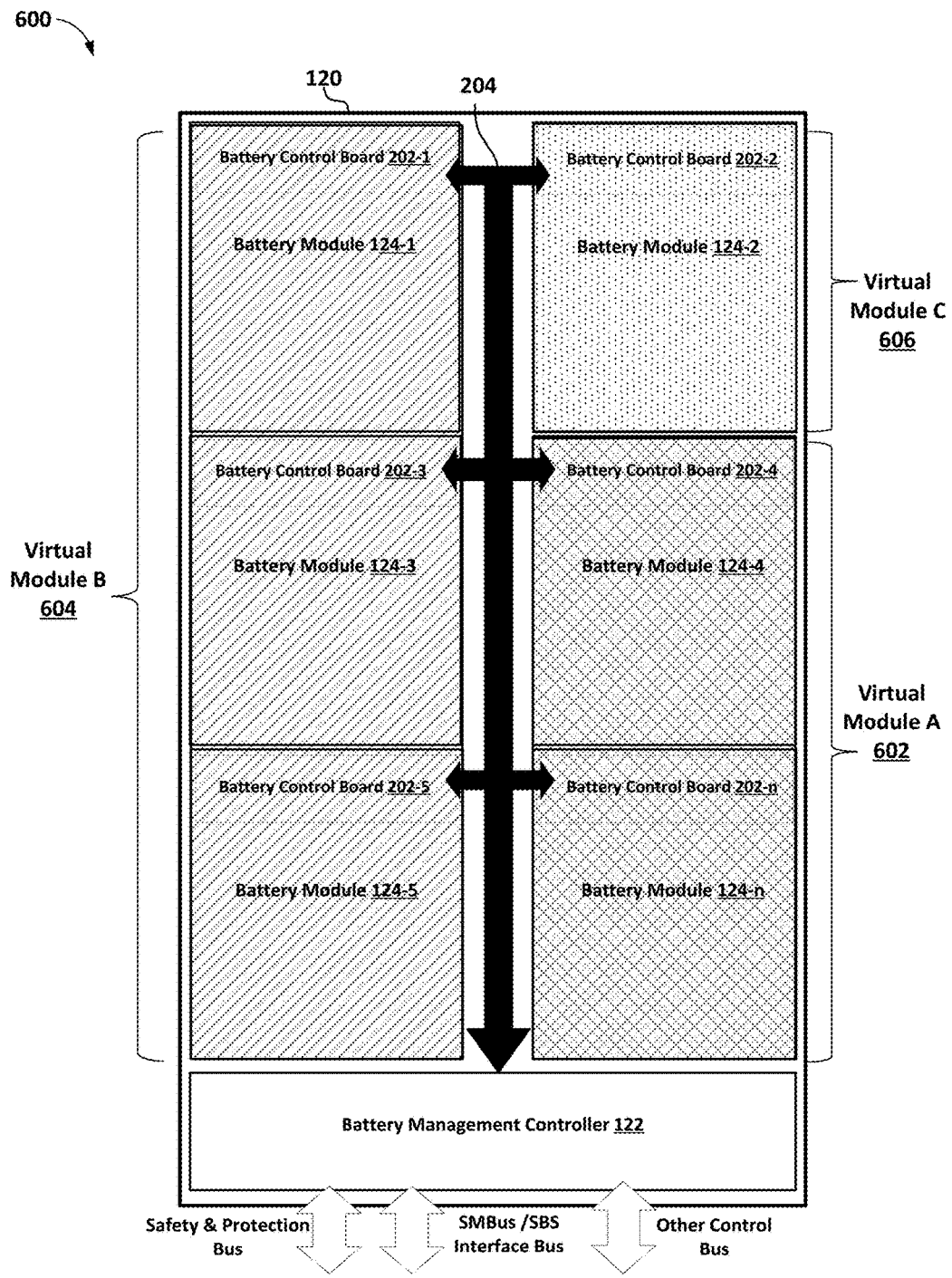
FIG. 6 is a schematic diagram of an example smart battery configured with virtual modules of the computer device of FIG. 1.

Referring to FIG. 6, conceptual diagram 600 is shown of another example of a structure of a smart battery and its components. For example, the conceptual diagram 400 includes an example of smart battery 120 (FIG. 1) of computing device 102 that uses one or more virtual modules for load balancing. Each virtual module is configured to provide power for a designated purpose. Although not shown, each battery module of smart battery 120 may include at least one charging coil, such as charging coils 208-1, 208-2, 208-3, 208-4, 208-5, and 208-n.

Virtual modules may include one or more battery modules of the smart battery 120, and each virtual module may have a specific configuration and/or association. For example, battery management controller 122 may configure one or more battery modules of smart battery 120 into one or more virtual modules based on at least one of battery capacity levels of each of the one or more battery modules, application demands, or load conditions. In an example, each virtual module may be associated with one or more applications 116 operating on the computing device 102, so that the operation of an application 116 is powered by the associated virtual module. Battery management controller 122 may activate each battery module corresponding to a virtual module in response to activation of one of the one or more applications 116. In another example, each virtual module may be associated with one or more components operating on the computing device 102, so that the operation of the component is powered by the associated virtual module. Battery management controller 122 may activate each battery module corresponding to a virtual module in response to activation of one of the one or more components.

In an example, battery management controller 122 may configure battery modules 124-4 and 124-n into virtual module A 602, battery modules 124-1, 124-3, and 124-5 into virtual module B 604, and battery module 124-2 into virtual module C 606. Each of virtual module A 602, virtual module B 604, and virtual module C 606 may be associated with either one or more applications 116 or one or more components operating on the computing device 102. In an instance, virtual module A 602 may be associate with a processor 110 (FIG. 1) operating on computing device 102. Therefore, whenever the processor 110 is operating, battery management controller 122 may configure virtual module A 602 to provide power to processor 110. Further, virtual module B 604 may be associated with display 130 (FIG. 1) of computing device 102. Battery management controller 122 may configure three battery modules with virtual module B 604 and associate virtual module B 604 with display 130 since display 130 requires a substantial amount of power to operate. Additionally, virtual module C 606 may be associated with one or more applications 116 operating on computing device 102, so that whenever an application 116 is accessed, battery management controller 122 configures virtual module C 606 to provide the necessary power.

Figure 7:
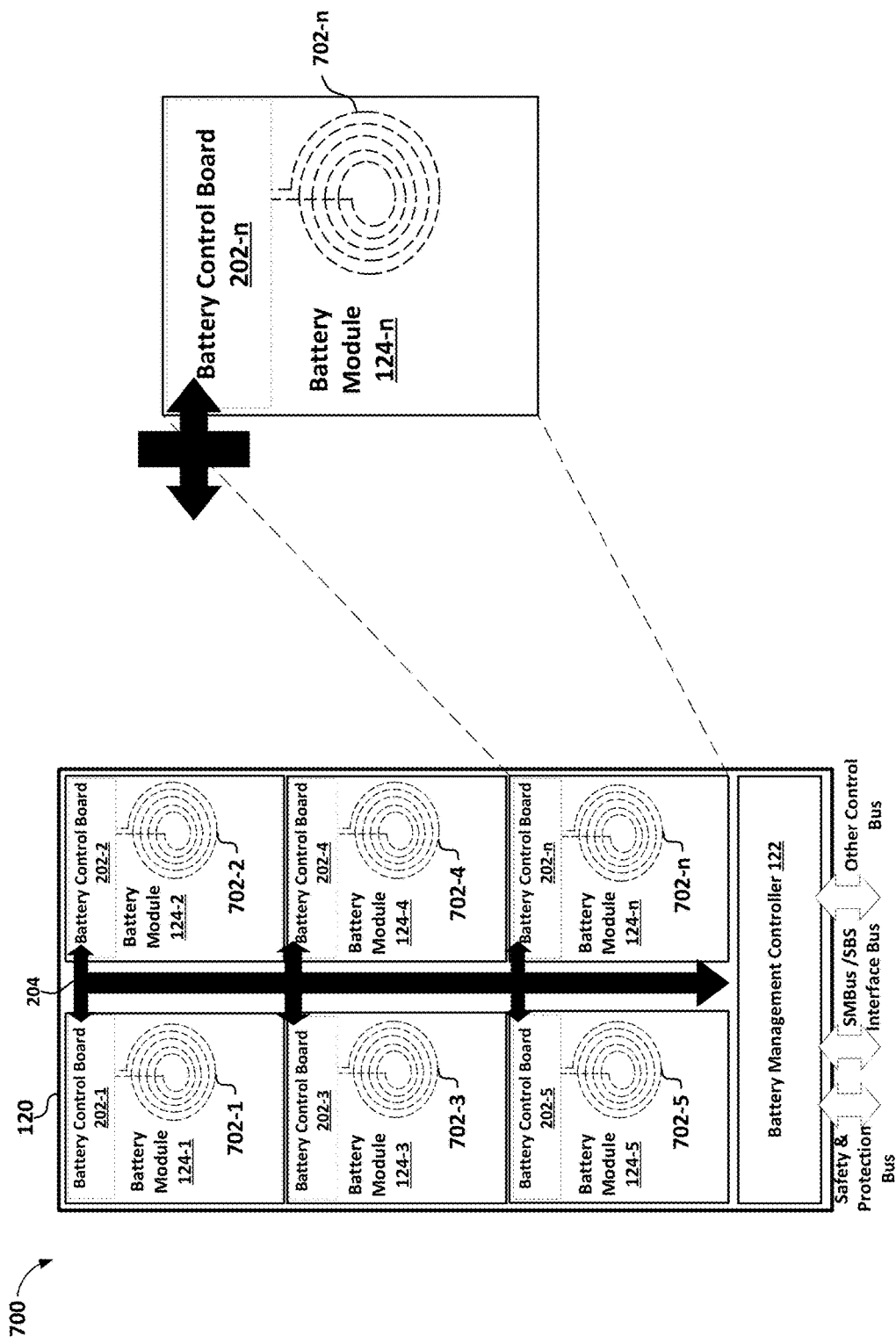
FIG. 7 is a schematic diagram of an example smart battery configured with energy harvesting micro-coils of the computer device of FIG. 1.

Referring to FIG. 7, conceptual diagram 700 is shown of another example of a structure of a smart battery and its components. For example, the conceptual diagram 700 includes an example of smart battery 120 (FIG. 1) of computing device 102 that uses one or more micro-coils for harvesting power from high-frequency signals. Although not shown, each battery module of smart battery 120 may include at least one charging coil, such as charging coils 208-1, 208-2, 208-3, 208-4, 208-5, and 208-n.

Micro-coils 702-1, 702-2, 702-3, 702-4, 702-5, and 702-n are smaller in size than charging coils 208-1, 208-2, 208-3, 208-4, 208-5, and 208-n, and are configured to harvest power from based on the high frequency signal coupling energy to at least one of the plurality of micro-coils 702-1, 702-2, 702-3, 702-4, 702-5, and 702-n at a frequency as at least one of the plurality of micro-coils 702-1, 702-2, 702-3, 702-4, 702-5, and 702-n. In an example, each of the plurality of micro-coils 702-1, 702-2, 702-3, 702-4, 702-5, and 702-n connects to a respective one of the plurality of battery control boards 202-1, 202-2, 202-3, 202-4, 202-5, and 202-n. Battery management controller 122 may determine whether charging coils 208-1, 208-2, 208-3, 208-4, 208-5, and 208-n are currently receiving power from a wireless signal and/or whether the battery modules 124-1, 124-2, 124-3, 124-4, 124-5, and 124-n are currently charging. Based on a determination that charging coils 208-1, 208-2, 208-3, 208-4, 208-5, and 208-n are currently not receiving a power from a wireless signal and/or the battery modules 124-1, 124-2, 124-3, 124-4, 124-5, and 124-n are currently not charging, battery management controller 122 may configure one or more of the battery control boards 202-1, 202-2, 202-3, 202-4, 202-5, and 202-n to activate the respective micro-coils 702-1, 702-2, 702-3, 702-4, 702-5, and 702-n to receive the high frequency signal. In some instances, the high frequency signal is a component of a Wi-Fi signal, or one of its components (e.g. harmonics).

Figure 8:
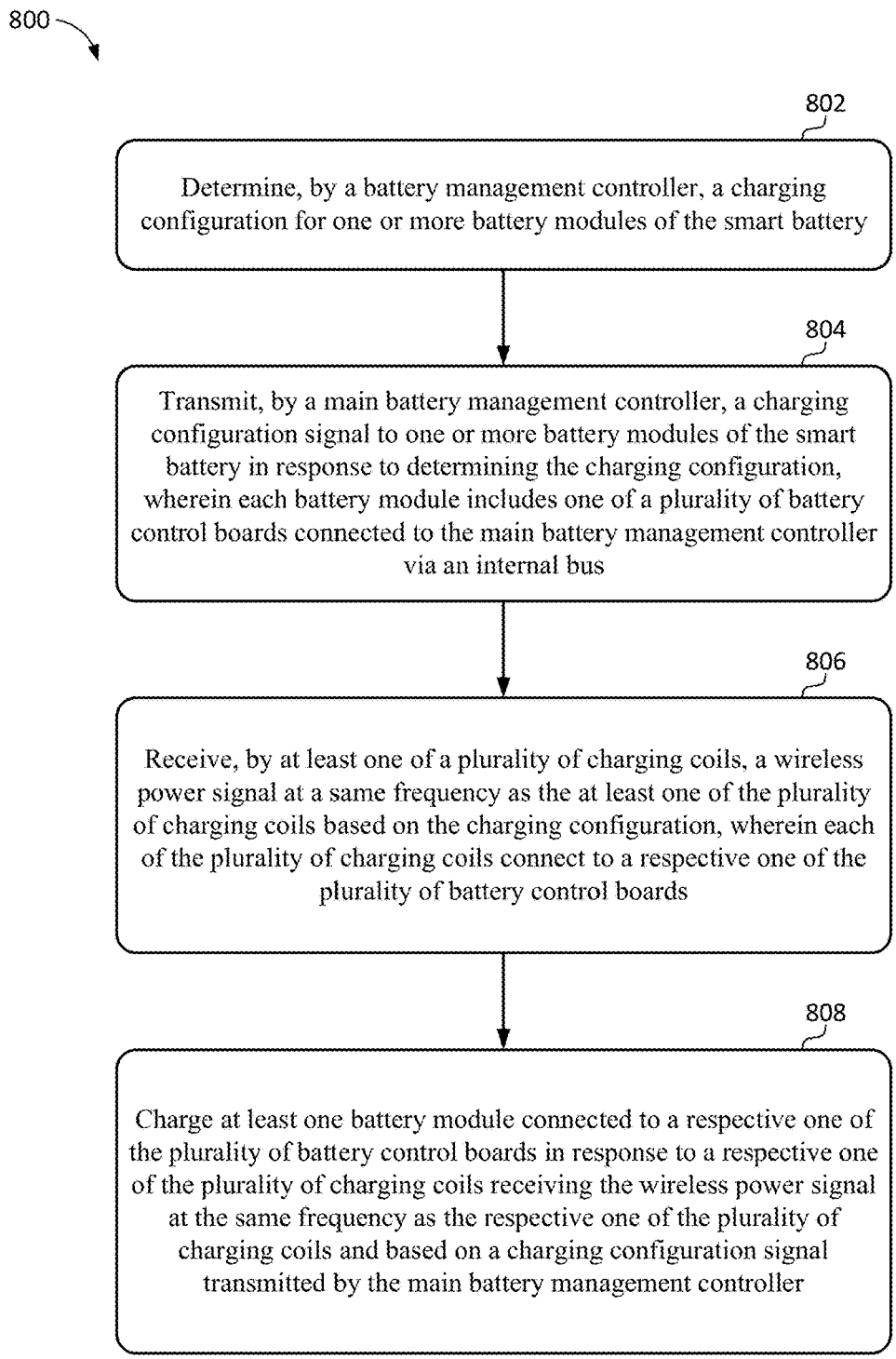
FIG. 8 is a flowchart of an example of a method of charging a smart battery according to the present disclosure.

FIG. 8 is a flow diagram illustrating examples of a method 800 related to charging a smart battery in accordance with various implementations of the present disclosure. Although the operations described below are presented in a particular order and/or as being performed by an example component, it should be understood that the ordering of the actions and the components performing the actions may be varied, depending on the implementation. Moreover, it should be understood that any of actions or components described below with respect to the smart battery 120 (FIGS. 1 and 2) and/or its subcomponents may be performed by a specially-programmed processor, a processor executing specially-programmed software or computer-readable media, or by any other combination of a hardware component and/or a software component specially configured for performing the described actions or components.

In an implementation, at block 802, the method 800 may determine, by a battery management controller, a charging configuration for managing one or more battery modules of the smart battery. For example, the battery management controller 122 (FIGS. 1 and 2) may determine a charging configuration for managing one or more battery modules 124 of the smart battery 120.

In an implementation, at block 804, the method 800 may transmit, by a battery management controller, a charging configuration signal to one or more battery modules of the smart battery in response to determining the charging configuration, wherein each battery module includes one of a plurality of battery control boards connected to the battery management controller via an internal bus. For example, the battery management controller 122 (FIGS. 1 and 2) may transmit a charging configuration signal to one or more battery modules 124 of the smart battery 120 in response to determining the charging configuration. In an example, each battery module 124 includes one of a plurality of battery control boards 202-1, 202-2, 202-3, 202-4, 202-5, and 202-n connected to the battery management controller 122 via an internal bus 204.

In an implementation, at block 806, the method 800 may receive, by at least one of a plurality of charging coils, power from a wireless signal based on the wireless signal coupling energy to at least one of the plurality of charging coils at a frequency as the at least one of the plurality of charging coils and based on the charging configuration, wherein each of the plurality of charging coils connect to a respective one of the plurality of battery control boards. For example, the battery management controller 122 (FIGS. 1 and 2) and/or one or more of the plurality of battery control boards 202-1, 202-2, 202-3, 202-4, 202-5, and 202-n to execute one or more of the charging coils 208-1, 208-2, 208-3, 208-4, 208-5, and 208-n to receive power from a wireless signal based on the wireless signal coupling energy to at least one of the plurality of charging coils 208-1, 208-2, 208-3, 208-4, 208-5, and 208-n at a frequency as the at least one of the plurality of charging coils 208-1, 208-2, 208-3, 208-4, 208-5, and 208-n based on the charging configuration. In an example, each of the plurality of charging coils 208-1, 208-2, 208-3, 208-4, 208-5, and 208-n connect to a respective one of the plurality of battery control boards 202-1, 202-2, 202-3, 202-4, 202-5, and 202-n.

In an implementation, at block 808, the method 800 may charge at least one battery module connected to a respective one of the plurality of battery control boards in response to a respective one of the plurality of charging coils receiving power from the wireless signal and based on a charging configuration signal transmitted by the battery management controller. For example, the battery management controller 122 (FIGS. 1 and 2) may execute one or more of the plurality of battery control boards 202-1, 202-2, 202-3, 202-4, 202-5, and 202-n to charge at least one battery module 124-1, 124-2, 124-3, 124-4, 124-5, and 124-n connected to a respective one of the plurality of battery control boards 202-1, 202-2, 202-3, 202-4, 202-5, and 202-n in response to a respective one of the plurality of charging coils 208-1, 208-2, 208-3, 208-4, 208-5, and 208-n receiving power from the wireless signal and based on a charging configuration signal transmitted by the battery management controller 122.

Figure 9:
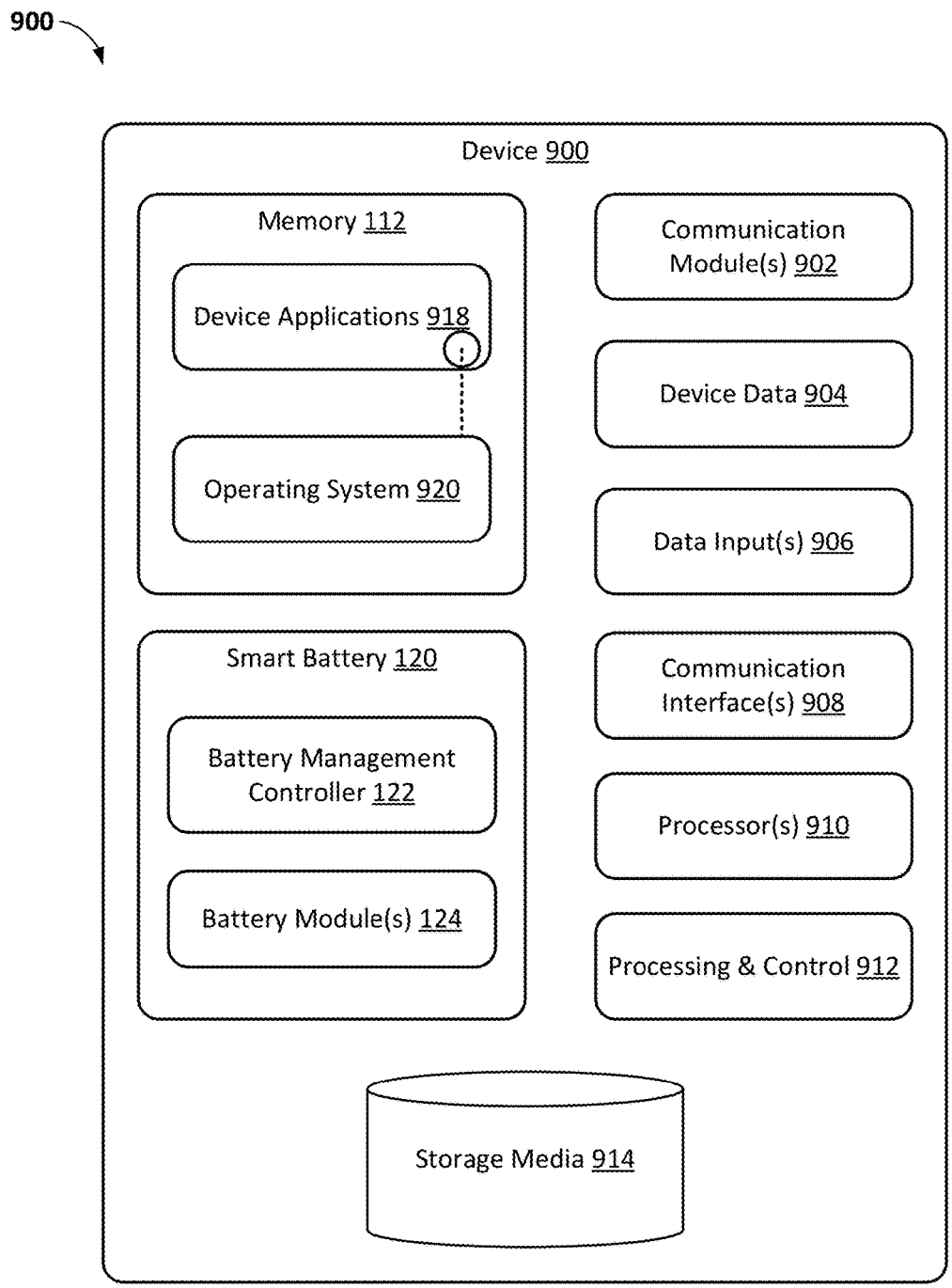
FIG. 9 illustrates an example device in which techniques of ultrafast charging of smart battery devices can be implemented.

FIG. 9 illustrates various components of example device 900 that can be implemented as any type of mobile, electronic, and/or computing device as described with reference to the previous FIGS. 1-8 to implement techniques for ultrafast charging of multi-battery devices. In embodiments, device 900 can be implemented as one or a combination of a wired and/or wireless device, as a form of television client device (e.g., television set-top box, digital video recorder (DVR), etc.), consumer device, computer device, server device, portable computer device, user device, IoT device, communication device, video processing and/or rendering device, appliance device, gaming device, electronic device, and/or as another type of device. Device 900 may also be associated with a user (e.g., a person) and/or an entity that operates the device such that a device describes logical devices that include users, software, firmware, and/or a combination of devices.

Device 900 includes communication modules 902 that enable wired and/or wireless communication of device data 904 (e.g., received data, data that is being received, data scheduled for broadcast, data packets of the data, etc.). Device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques enabling load allocation in multi-battery devices. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures. Device 900 may be configured to operate from any suitable power source, such as smart battery 120 including battery management controller 122 and battery module(s) 124, various external power sources (e.g., alternating-current (AC) power supplies), and the like.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like.

Memory 112 may correspond to computer-readable storage media, and provides data storage mechanisms to store device data 904, as well as various device applications 918 and any other types of information and/or data related to operational aspects of device 900. For example, an operating system 920 can be maintained as a computer application with the computer-readable storage media 914 and executed on processors 910. Device applications 918 may include a device manager, such as any form of a control application, software application, signal-processing and control module, code that is native to a particular device, a hardware abstraction layer for a particular device, and so on.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computing device 102 and/or computing device 900), which can be a wired device or a wireless device. A wireless device may be a wearable electronic device, a cellular telephone, a satellite phone, a cordless telephone, a Session Initiation Protocol (SIP) phone, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP battery module, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A smart battery of a computing device, comprising:
    a battery management controller configured to manage one or more battery modules of the smart battery;
    a plurality of battery control boards connected to the battery management controller via an internal bus, wherein each of the plurality of battery control boards communicates with the other battery control boards and the battery management controller via the internal bus;
    a plurality of charging coils configured to receive power from a wireless signal based on the wireless signal coupling energy to at least one of the plurality of charging coils at a frequency of the at least one of the plurality of charging coils, wherein each of the plurality of charging coils connects to at-least one of the plurality of battery control boards, and wherein a first portion of the plurality of charging coils receive power from the wireless signal at a first frequency and a second portion of the plurality of charging coils receive power from the wireless signal at a second frequency, the second frequency differing from the first frequency;
    at least one battery module, comprising said one of the battery control boards, wherein each battery module is charged based on the power received by the at-least one of the plurality of charging coils and a charging configuration signal transmitted by the battery management controller via the internal bus; and
    wherein the battery management controller configures one or more battery modules into at least one virtual module based on at least one of battery capacity levels of each of the one or more battery modules, application demands, resource demands, or load conditions.

2. The smart battery of claim 1, wherein each of the plurality of charging coils partially overlaps with at least one other charging coil of the plurality of charging coils.

3. The smart battery of claim 2, wherein the battery management controller configures at least one of the plurality battery control boards to modify the respective one of the plurality of charging coils to receive the power of the wireless signal in at least one of a time division multiplex configuration or frequency division multiplex configuration.

4. The smart battery of claim 1, wherein each of the plurality of charging coils receive the wireless power signal simultaneously.

5. The smart battery of claim 1, wherein at least one of the plurality of battery control boards is configured to determine whether a parameter of the at least one battery module meets a set capacity threshold, and
wherein the battery management controller adjusts a charging configuration of the at least one battery module based on a determination that the parameter of the at least one battery module meets the set capacity threshold.

6. The smart battery of claim 5, wherein the battery management controller transmits, via the internal bus, the charging configuration signal to the one of the plurality of battery control boards to disable a charging coil connected to the one of the plurality of battery control boards based on the determination that the parameter of the at least one battery module meets the set capacity threshold.

7. The smart battery of claim 1, further comprising a position alignment magnet to magnetically align the computing device with a charging station.

8. The smart battery of claim 1, wherein one of the plurality of battery control boards includes at-least one power line, at-least one sensor line, and at-least one control line configured to monitor the at least one battery module and communicate, via the internal bus, with the battery management controller.

9. The smart battery of claim 1, wherein one of the plurality of battery control boards includes at-least one temperature control sensor configured to monitor a temperature of the at least one battery module, and
wherein the one of the plurality of battery control boards disables a respective one of the plurality of charging coils based on a determination that the temperature of the at least one battery module meets a set temperature threshold.

10. The smart battery of claim 1, wherein each battery module is replaceable with another battery module.

11. The smart battery of claim 1, wherein the battery management controller is further configured to:
determine whether a wear level parameter corresponding to the at least one battery module corresponding to a respective one of the plurality of battery control boards meets a set wear level threshold;
transmit a wear level signal to a second battery management controller of a second smart battery of the computing device based on a determination that the wear level corresponding to the at least one battery module meets the set wear level threshold, wherein the wear level signal indicates to the second battery management controller to activate a battery control board of the second smart battery; and
disables the respective one of the plurality of battery control boards corresponding to the at least one battery module in response to the second battery management controller activating the battery control board of the second smart battery.

12. The smart battery of claim 1, wherein each virtual module is configured to provide power for a designated purpose.

13. The smart battery of claim 12, wherein each virtual module is associated with one or more applications operating on the computing device, and wherein the battery management controller activates each battery module corresponding to a virtual module in response to activation of one of the one or more applications.

14. The smart battery of claim 12, wherein each virtual module is associated with one or more resources operating on the computing device, and wherein the battery management controller activates each battery module corresponding to a virtual module in response to activation of one of the one or more resource.

15. The smart battery of claim 1, further comprising a plurality of micro-coils configured to receive power from a high frequency signal based on the high frequency signal coupling energy to at least one of the plurality of micro-coils at a frequency of at least one of the plurality of micro-coils, wherein each of the plurality of micro-coils connect to a respective one of the plurality of battery control boards.

16. The smart battery of claim 15, wherein the at least one of the plurality of micro-coils is configured to receive power from the high frequency signal based on a determination that the plurality of charging coils are not receiving power from the wireless signal.

17. The smart battery of claim 15, wherein the high frequency signal is a harmonic component of a signal.

18. The smart battery of claim 1, wherein the battery management controller includes at-least one of a System Management Bus (SMBus) or a Smart Battery System (SBS) interface for communicating information between the smart battery and one or more components of the computing device.

19. A method of charging a smart battery, comprising:
determining, by a battery management controller, a charging configuration for managing one or more battery modules of the smart battery;
transmitting, by a battery management controller, a charging configuration signal to one or more battery modules of the smart battery in response to determining the charging configuration, wherein each battery module includes one of a plurality of battery control boards connected to the battery management controller via an internal bus;
receiving, by at least one of a plurality of charging coils, power from a wireless signal based on the wireless signal coupling energy to at least one of the plurality of charging coils at a frequency of the at least one of the plurality of charging coils and based on the charging configuration, wherein each of the plurality of charging coils connect to a respective one of the plurality of battery control boards, and wherein a first portion of the plurality of charging coils receive power from the wireless signal at a first frequency and a second portion of the plurality of charging coils receive power from the wireless signal at a second frequency, the second frequency differing from the first frequency;
charging at least one battery module connected to a respective one of the plurality of battery control boards in response to a respective one of the plurality of charging coils receiving the power from the wireless signal and based on a charging configuration signal transmitted by the battery management controller; and
configuring, by the battery management controller, one or more battery modules into at least one virtual module based on at least one of battery capacity levels of each of the one or more battery modules, application demands, resource demands, or load conditions.

20. A non-transitory computer-readable medium storing computer-executable instructions executable by a processor for charging a smart battery in a computing device, comprising:
- instructions for determining, by a battery management controller, a charging configuration for managing one or more battery modules of the smart battery;
- instructions for transmitting, by a battery management controller, a charging configuration signal to one or more battery modules of the smart battery in response to determining the charging configuration, wherein each battery module includes one of a plurality of battery control boards connected to the battery management controller via an internal bus;
- instructions for receiving, by at least one of a plurality of charging coils, power from a wireless signal based on the wireless signal coupling energy to at least one of the plurality of charging coils at a frequency of the at least one of the plurality of charging coils and based on the charging configuration, wherein each of the plurality of charging coils connect to a respective one of the plurality of battery control boards, and wherein a first portion of the plurality of charging coils receive power from the wireless signal at a first frequency and a second portion of the plurality of charging coils receive power from the wireless signal at a second frequency, the second frequency differing from the first frequency;
- instructions for charging at least one battery module connected to a respective one of the plurality of battery control boards in response to a respective one of the plurality of charging coils receiving the power from the wireless signal and based on a charging configuration signal transmitted by the battery management controller; and
- configuring, by the battery management controller, one or more battery modules into at least one virtual module based on at least one of battery capacity levels of each of the one or more battery modules, application demands, resource demands, or load conditions.

* * * * *